United States Patent [19]

Yamaguchi

[11] Patent Number: 5,036,239
[45] Date of Patent: Jul. 30, 1991

[54] FLAT CORELESS VIBRATOR MOTOR

[75] Inventor: Tadao Yamaguchi, Isesaki, Japan

[73] Assignee: Tokyo Parts Electronic Co., Ltd., Isesaki, Japan

[21] Appl. No.: 526,737

[22] Filed: May 22, 1990

[30] Foreign Application Priority Data

Aug. 26, 1988 [JP] Japan .................. 63-111868

[51] Int. Cl.⁵ .......................................... H02K 7/075
[52] U.S. Cl. ...................................... 310/268; 310/81; 340/311.1; 340/407
[58] Field of Search ............ 310/40 MM, 51, 81, 82, 310/261, 268; 318/114; 340/311.1, 407

[56] References Cited

U.S. PATENT DOCUMENTS

| | | | |
|---|---|---|---|
| 3,348,086 | 10/1967 | Monma | 310/268 |
| 3,584,249 | 6/1971 | Murphy | 310/81 |
| 4,034,246 | 7/1977 | Nakashima | 310/81 |
| 4,864,276 | 9/1989 | Tribbey et al. | 340/407 |
| 4,931,765 | 6/1990 | Rollins et al. | 340/407 |

FOREIGN PATENT DOCUMENTS

| | | | |
|---|---|---|---|
| 2163019 | 6/1973 | Fed. Rep. of Germany | 310/81 |
| 61-88752 | 5/1986 | Japan | 310/40 MM |
| 63-290153 | 11/1988 | Japan . | |

*Primary Examiner*—Steven L. Stephan
*Assistant Examiner*—D. L. Rebsch
*Attorney, Agent, or Firm*—Armstrong, Nikaido, Marmelstein, Kubovcik & Murray

[57] ABSTRACT

A flat coreless vibrator motor includes a casing for housing the motor, a shaft rotatably supported by the casing, a rotor mounted on the shaft and being generally in the shape of a sector, the shaft being disposed at the center of a circle, along which a generally arc-shaped outer periphery of the sector generally extends. At least three armature coils are provided on the rotor and are angularly arranged in such a manner that these armature coils do not overlap each other. A magnet is mounted on the casing so as to generate a magnetic flux. A commutator and brushes cooperate with each other to supply electric power to the armature coils. Since the rotor is eccentric, vibrations are produced during the rotation of the rotor.

4 Claims, 4 Drawing Sheets

FLAT CORELESS VIBRATOR MOTOR

BACKGROUND OF THE INVENTION

1. Field of the Invention

This invention relates to a flat coreless vibrator motor suitable for use as a silent alerting source for a portable card-type device.

2. Description of the Prior Art

There is a conventional vibrator motor in which an eccentric plate is mounted on an output shaft of a rotary motor of the ordinary type. Such a conventional vibrator motor is disclosed, for example, in Japanese Patent Application Laid-Open No. 63-290153. However, it is difficult to make such a vibrator motor thin because of the provision of the eccentric plate.

There is a conventional flat coreless vibrator motor in which one of three armature coils arranged on a rotor at an equal angular interval, i.e. pitch angle of 120°, is removed. Such a vibration motor is disclosed in the above Japenese Patent Application Laid-Open No. 63-290153. However, this conventional vibrator motor has a problem in that since there are only two armature coils, those portions which contribute to the production of torque cannot be sufficiently large, and therefore in order to obtain the required torque, a large amount of current is required. Another problem is that the rotor, having the two armature coils angularly spaced 120° from each other, can not provide a sufficient weight unbalance which contributes to the production of vibrations.

There is known another flat coreless vibrator motor in which one of three armature coils arranged on a rotor at an equal angular interval, i.e. pitch angle of 120°, is smaller in size than the other two. Such a vibrator motor is disclosed in U.S. Pat. No. 4,864,276. However, in this conventional vibrator motor, since the rotor, having the three armature coils (one of which is smaller in size) angularly spaced 120° from one another, has a disk-shaped configuration, weight unbalance of the rotor which contributes to the production of vibration is small. As a result, the amplitude of the vibration produced during the rotation of the rotor is small, and the vibration frequency becomes high. Therefore, when such a vibrator motor is used as an alerting source for a portable card-type device, users of the device feel unpleasant.

SUMMARY OF THE INVENTION

It is therefore an object of this invention to provide a flat coreless vibrator motor which is suitable for an alerting source for a portable card-type device, thin in configuration, consumes less power, and capable of producing vibration efficiently with a high amplitude in a large amount.

According to the present invention, there is provided a flat coreless vibrator motor comprising:

a casing for housing the motor;

a shaft rotatably supported by the casing;

a rotor mounted on the shaft and being generally in the shape of a sector;

at least three armature coils provided on the rotor and angularly arranged at a predetermined pitch about the shaft, said armature coils being not overlapped by each other;

means mounted on the casing for generating a magnetic flux; and means for supplying electric power to the armature coils.

The shaft may be prevented from projecting outwardly of the casing.

The electric power supplying means may comprise a flat-type commutator having a plurality of segments disposed in a common plane, and brushes.

The armature coils are angularly arranged at a pitch of 60° to 90°, and preferably 70° to 80°.

DETAILED DESCRIPTION OF PREFERRED EMBODIMENTS

The invention will now be described with reference to the drawings.

Figure 1:
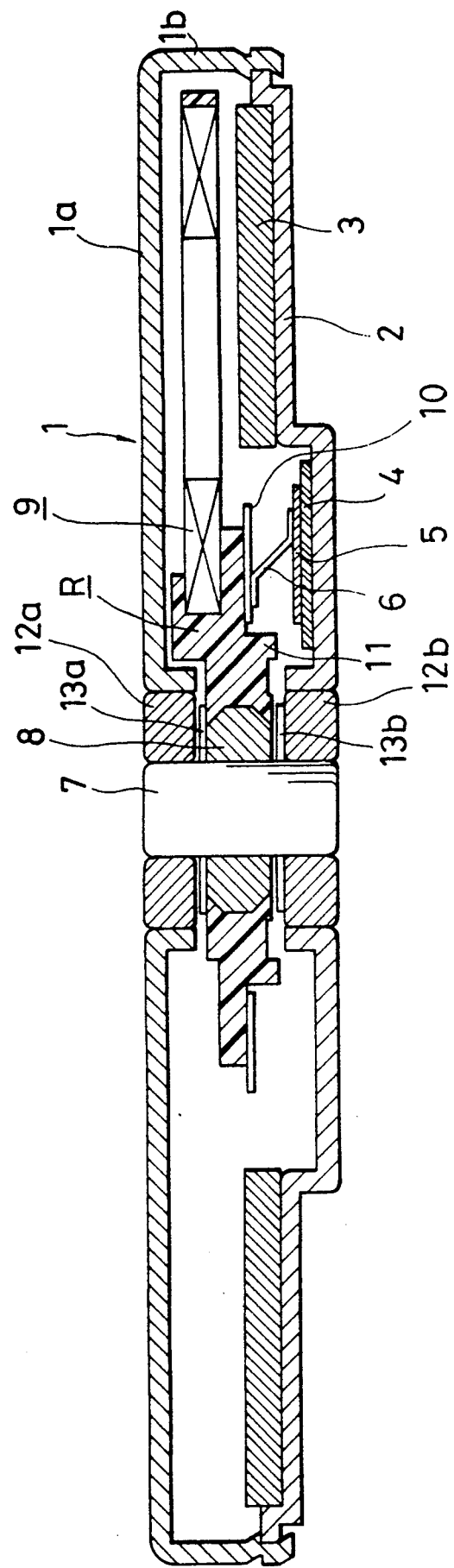
FIG. 1 is a cross-sectional view of a flat coreless vibrator motor of the present invention along the axis of output shaft thereof.

FIG. 1 shows a cross-sectional view of a flat coreless vibrator motor of the present invention along the axis of an output shaft thereof.

A casing 1 of the vibrator motor includes an upper portion 1a of a disk-shape having a central hole, and a skirt portion 1b of a short cylindrical shape extending downward from the outer periphery of the upper portion 1a. A disk-shaped end plate 2 having a central hole is fitted in and fixed to a lower open end of the casing 1. A shaft 7 is rotatably supported on the central portions of the casing 1 and the end plate 2 through lubricant-containing bearings 12a and 12b. A ring-shaped magnet 3 made of a rare earth element is mounted on an upper surface of the end plate 2, and surrounds the shaft 7 in coaxial relation thereto. The magnet 3 is so magnetized that it has alternate north and south poles N and S arranged around the shaft 7 at a pitch angle of 90°. The upper surface of the magnet 3 is disposed in opposed relationship to a lower surface of a rotor R as later described. A brush terminal plate 5 is mounted on the upper surface of the end plate 2 via a thin, electrically-insulated brush base 4, the brush terminal plate 5 being disposed inwardly of the magnet 3. A pair of brushes 6 and 6 are mounted on the brush terminal plate 5 as later described. Only one of the two brushes 6 and 6 is shown in FIG. 1.

A rotor body 11 is made of a synthetic resin such as glass fiber-reinforced polyethylene phthalate. The rotor body 11 integrally connects a holder 8 of brass and armature coils 9 together to form the rotor R, the holder 8 being fixedly fitted on the shaft 7.

Figure 2:
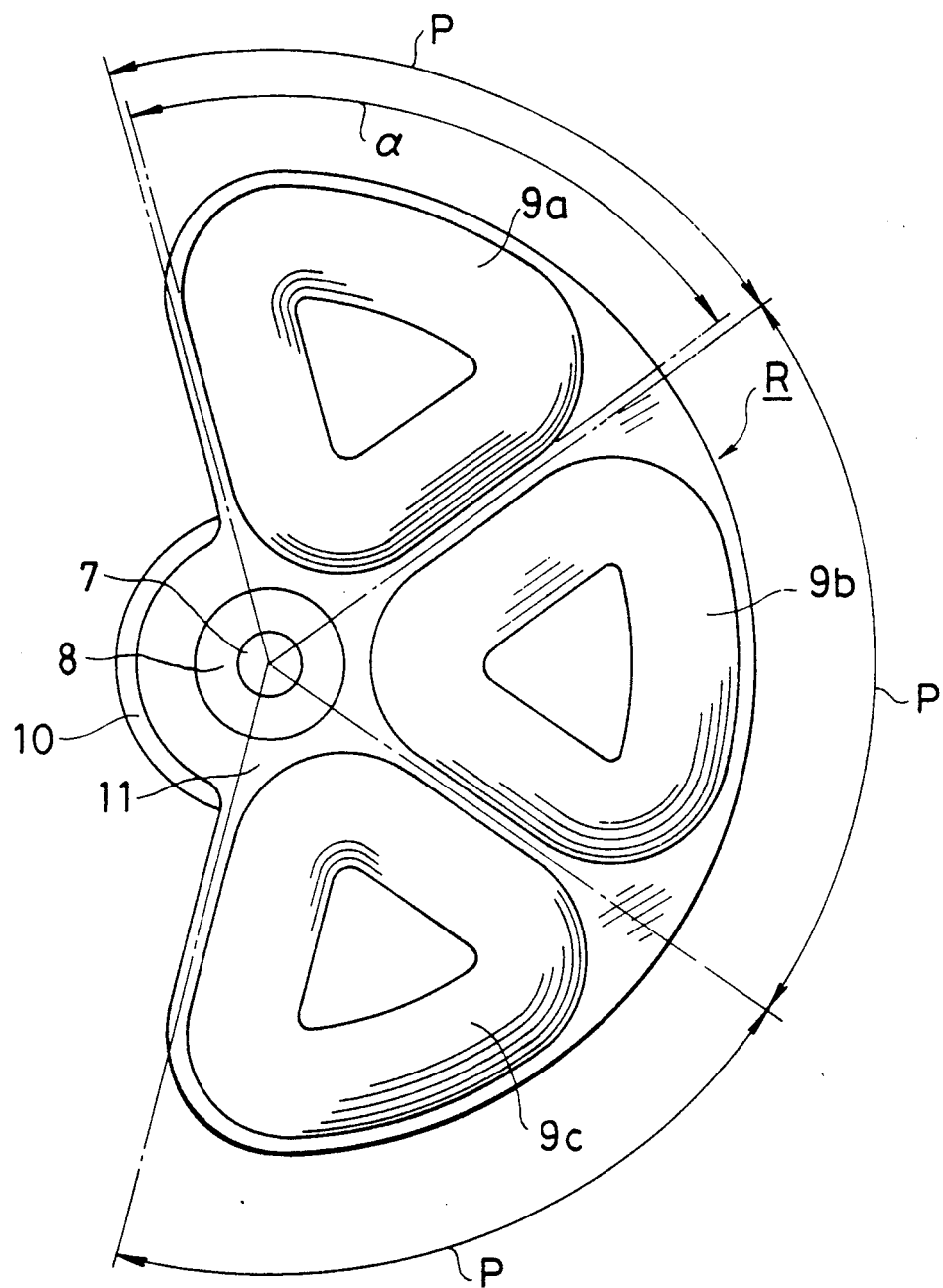
FIG. 2 is a plan view of a rotor of the vibrator motor of FIG. 1.

FIG. 2 is a plan view of the rotor R, and the rotor R has a generally sector-shape or fan-shape as later described. The rotor R has three armature coils 9a, 9b and 9c (generally designated at 9) angularly arranged at an equal pitch angle P of about 75°. In order that the conductor portions of each armature coil 9a, 9b, 9c which extend generally radially of the rotor R and contribute to the generation of the torque can approach as much as possible to a reference electrical angle (90°) equal to the pitch angle of magnetization of the magnet 3, it is desirable that the winding of each coil be extended or widened as much as possible within the pitch angle P. In other words, a central angle α of each of the armature coils which is formed by opposing side edges thereof is preferably substantially equal to the pitch angle P. Experiments indicate that in view of the vibration amount and the power consumption, the pitch angle P is preferably in the range of between 70° and 80°, and most preferably about 75°.

The rotor R of a generally sector-shape is molded of the synthetic resin integrally interconnecting the shaft 7, the holder 8 and the armature coils 9a, 9b and 9c. The shaft 7 is disposed at the center of a circle along which the arc-shaped outer periphery of the sector extends. The armature coils 9a, 9b and 9c are beforehand delta-connected or star-connected in the rotor R. The terminal ends of the armature coils 9a, 9b and 9c are connected to segments on a ring-shaped, flat commutator 10 attached to the rotor R. The commutator 10 comprises a ring-shaped printed circuit board on which a plating of a precious metal is formed to provide the segments. The brushes 6 are resiliently held in contact with the commutator 10. Since the commutator 10 is of a thin, flat type, the overall thickness of the vibrator motor can be reduced.

A slide washer 13a is interposed between the lubricant-containing bearing 12a and the holder 8, and another slide washer 13b is interposed between the lubricant-containing bearing 12b and the holder 8. The shaft 7 is retained such that the opposite ends of the shaft 7 are prevented from projecting outwardly beyond the casing 1 and the end plate 2, respectively. This arrangement of the shaft 7 makes it possible to reduce the overall thickness of the vibrator motor.

Figure 3:
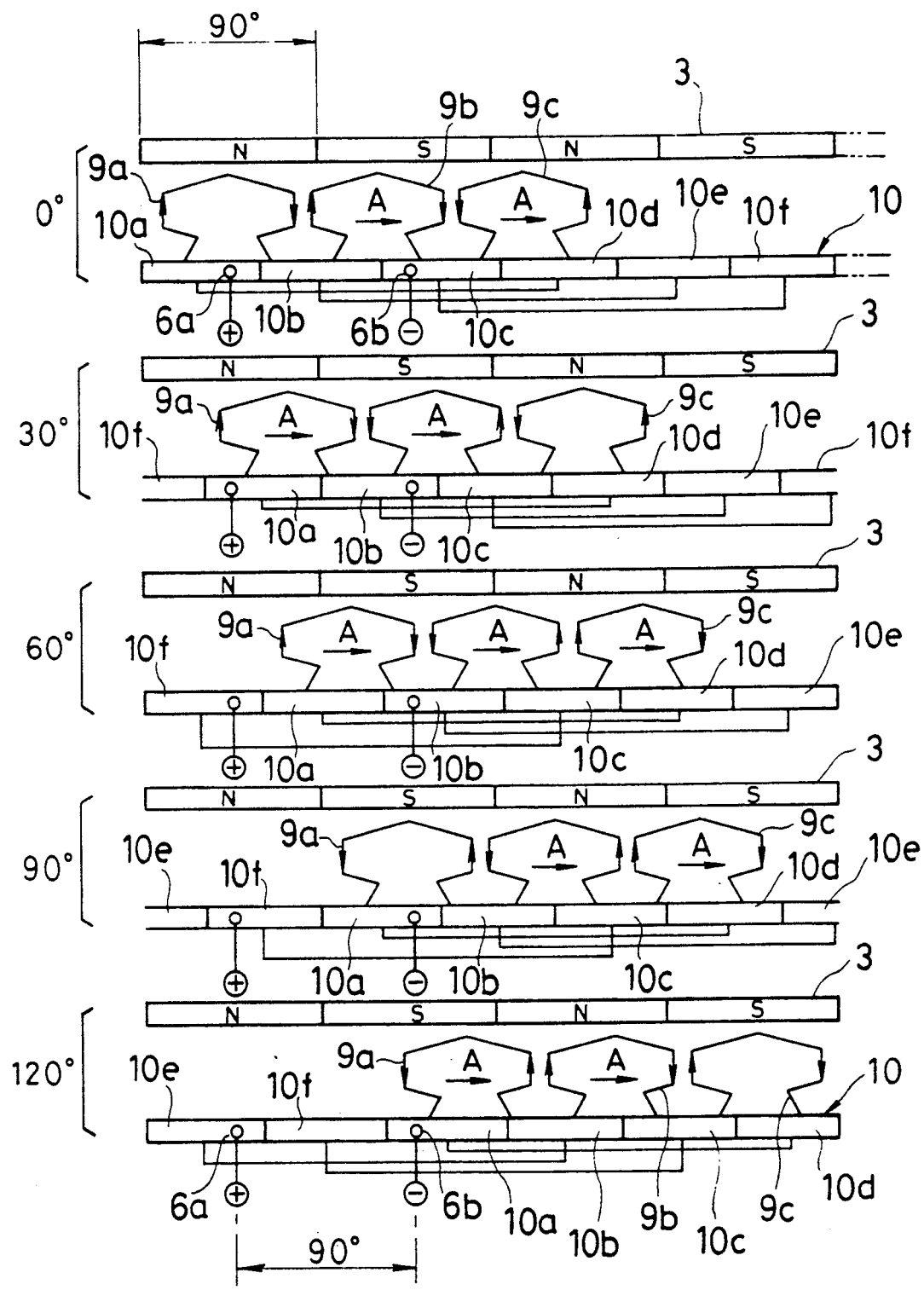
FIG. 3 is a developed view explanatory of the principle of the rotation of the flat coreless vibrator motor in the case where armature coils of the vibrator motor are delta-connected.

FIG. 3 is a developed view explanatory of the principle of the rotation of the flat coreless vibrator motor in the case where the armature coils 9a, 9b and 9c are delta-connected.

In FIG. 3, the terminal ends of the armature coil 9a are connected to the segments 10a and 10b of the commutator 10, respectively, the terminal ends of the armature coil 9b are connected to the segments 10b and 10c, respectively, and the terminal ends of the armature coil 9c are connected to the segments 10c and 10d, respectively. Each pair of diametrically-opposite (i.e., 180° spaced-apart) segments are connected to each other at the reverse side of the printed circuit board of the commutator 10 via a through hole in this printed board, so that each pair of diametrically-opposite segments are at the same potential. Reference numerals 6a and 6b denote a brush piece of positive polarity and a brush piece of negative polarity, respectively. The brush pieces 6a and 6b are adapted to be urged into contact with the segments 10a to 10f with an electrical angle of 90°. An arrow A denotes the direction of rotation of the rotor R.

When the brush pieces 6a and 6b are energized by a power source (not shown), first, at the angular position 0° of the rotor R, electric current flows through the armature coils 9a, 9b and 9c in directions indicated by arrows. As a result, according to Fleming's left-hand rule, torque is produced in the rotor R in the direction of arrow A. Subsequently, when the rotor R rotates in the direction of arrow A sequentially to the angular positions 30°, 60°, 90° and 120°, torque is similarly produced in the rotor R in the direction of arrow A. At angular positions other than the above-mentioned angular positions, torque is similarly produced.

Therefore, so long as the electric power is supplied from the power source, the above torque is produced in a cyclic manner, to thereby continue the rotation of the rotor R.

The rotor R is of a generally sector-shape, and the armature coils 9a, 9b and 9c are arranged on the rotor R. With this construction, during the rotation of the rotor R, a large centrifugal force is produced, thereby producing vibration.

Figure 4:
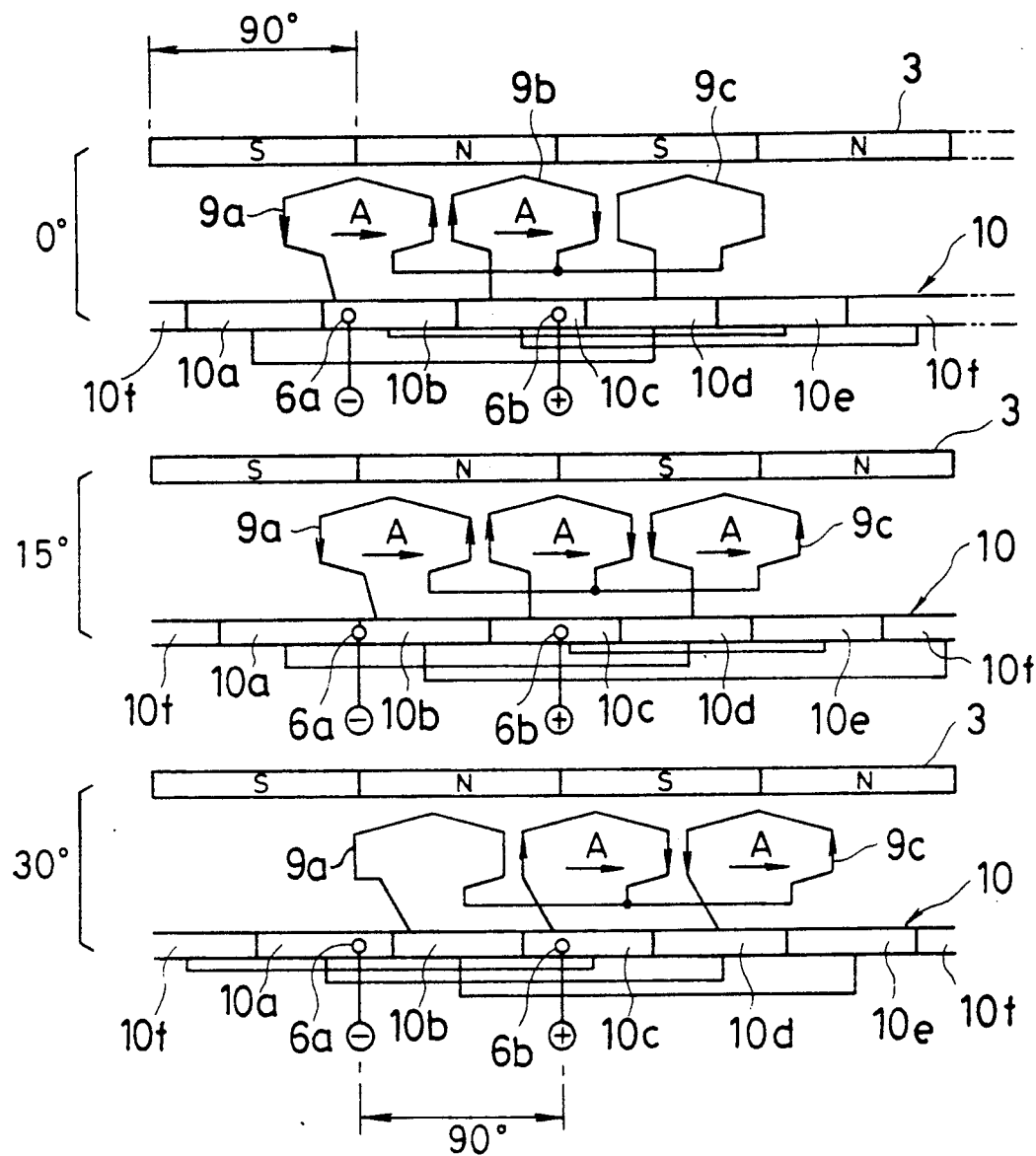
FIG. 4 is a developed view explanatory of the principle of the rotation of the flat coreless vibrator motor in the case where armature coils of the vibrator motor are star-connected.

FIG. 4 is a developed view explanatory of the principle of the rotation of the flat coreless vibrator motor in the case where the armature coils 9a, 9b and 9c are star-connected. In this case, also, similar effects or function as in the above delta-connection can be achieved.

Incidentally, there is a commonly-used coreless motor of the type which comprises a four-pole field magnet, and a disc-shaped rotor on which three armature coils are angularly arranged at an equal pitch angle of 120°. In the case where such a commonly-used coreless motor is modified in such a manner that one of the three armature coils is angularly displaced 180° to be positioned between the other two armature coils, the rotor can be of a sector-shape having a central angle 180° defined by the two sides of the sector, in which case the three armature coils can be arranged in the state that they do not overlap each other at a pitch angle P of 60°.

When the arrangement pitch angle P is thus 60°, the following advantages can be achieved. Namely, as in a commonly-used coreless motor in which three armature coils are arranged at an equal pitch angle of 120°, an electrically neutral point for determining the timing of energizing the armature coils can be obtained. If the arrangement pitch angle P is less than 60°, the rotor has a sector-shape having a central angle of less than 180°, and therefore the weight of the rotor is small, so that the vibration produced are small. Moreover, the central angle α of the armature coil becomes less than 60° so that the size of the conductor portions contributing to the generation of torque is limited, resulting in increasing in power consumption. Therefore, it is preferred that the arrangement pitch angle P not be less than 60°. However, if the arrangement pitch angle P is more than 90°, the rotor has a sector-shape having a central angle of more than 270° (90° × 3), and as a result the amount of eccentricity of the center of gravity of the rotor is small, so that the vibration produced are small. Therefore, it is preferred that the arrangement pitch angle P be in the range of between 60° and less than 90°.

While the invention has been particularly shown and described in reference to preferred embodiments thereof, it will be understood by those skilled in the art that changes in form and details may be made therein without departing from the spirit and scope of the invention.

What is claimed is:
1. A flat, coreless vibrator motor, comprising:
casing means for housing said motor;
a shaft rotatably supported by said casing means;
a rotor mounted on said shaft, said rotor being generally in the shape of a sector;
three armature coils provided on said rotor and angularly arranged at a predetermined pitch angle about said shaft, said armature coils being in non-overlapping relationship with each other;

a ring-shaped magnet mounted on said casing means, said ring-shaped magnet being magnetized so as to have alternate north and south poles arranged around a center axis of said shaft at a pitch angle of 90°; and means for supplying electric power to said armature coils, said supplying means including a flat-type commutator and a pair of brushes, wherein said flat-type commutator is attached to said rotor so as to be arranged within said ring-shaped magnet, and has six segments, each pair of diametrically opposing segments being connected to each other, and wherein said pair of brushes are mounted on said casing means so as to be urged into contact with said six segments with an electrical angle of 90°.

2. A vibrator motor as claimed in claim 1, wherein said shaft is prevented from projecting outwardly of said casing.

3. A vibrator motor as claimed in claim 1, wherein said armature coils are angularly arranged at a pitch angle of 60° to less than 90°.

4. A vibrator motor as claimed in claim 1, wherein opposing side portions of said armature coils are substantially exposed within said casing means.

* * * * *

UNITED STATES PATENT AND TRADEMARK OFFICE
CERTIFICATE OF CORRECTION

PATENT NO. : 5,036,239

DATED : July 30, 1991

INVENTOR(S) : Tadao YAMAGUCHI

It is certified that error appears in the above-identified patent and that said Letters Patent is hereby corrected as shown below:

On the cover page, delete Item [30].

Signed and Sealed this

Twenty-sixth Day of January, 1993

Attest:

STEPHEN G. KUNIN

Attesting Officer     Acting Commissioner of Patents and Trademarks